US012779489B2

(12) United States Patent
Chiarini et al.

(10) Patent No.: US 12,779,489 B2
(45) Date of Patent: Nov. 3, 2026

(54) SPRAYING BOOTH HAVING A FAST DISCHARGE AND PRODUCT CHANGE STATION AND RELATED METHOD OF USE

(71) Applicant: CEFLA Società Cooperativa, Imola (IT)

(72) Inventors: Stefano Chiarini, Imola (IT); Alessandro Felice, Imola (IT); Samuel Montefiori, Imola (IT); Angelo Carriero, Imola (IT); Alex Bartolotti, Imola (IT)

(*) Notice: Subject to any disclaimer, the term of this patent is extended or adjusted under 35 U.S.C. 154(b) by 354 days.

(21) Appl. No.: 18/661,611

(22) Filed: May 11, 2024

(65) Prior Publication Data

US 2024/0375142 A1 Nov. 14, 2024

(30) Foreign Application Priority Data

May 12, 2023 (IT) ........................ 102023000009609

(51) Int. Cl.

| | |
|---|---|
| ***B05B 15/72*** | (2018.01) |
| ***B05B 12/14*** | (2006.01) |
| ***B05B 13/04*** | (2006.01) |
| ***B05B 15/55*** | (2018.01) |
| ***B05B 16/00*** | (2018.01) |

(52) U.S. Cl.

CPC .............. *B05B 15/72* (2018.02); *B05B 12/14* (2013.01); *B05B 13/0405* (2013.01); *B05B 15/55* (2018.02); *B05B 16/95* (2018.02)

(58) Field of Classification Search

CPC ......... B05B 15/72; B05B 15/55; B05B 16/95; B05B 12/14; B05B 13/0405

See application file for complete search history.

(56) References Cited

U.S. PATENT DOCUMENTS

2002/0038755 A1* 4/2002 Virippil .................. B65G 45/22 198/494

FOREIGN PATENT DOCUMENTS

| | | |
|---|---|---|
| CN | 208261348 | 12/2018 |
| CN | 208261348 U * | 12/2018 |
| CN | 210474446 | 5/2020 |
| CN | 210474446 U * | 5/2020 |

OTHER PUBLICATIONS

Italian Patent and Trademark Office, Search Report, Nov. 13, 2023—Relevant portions are in English.

* cited by examiner

*Primary Examiner* — JaMel M Nelson

(74) *Attorney, Agent, or Firm* — Themis Law

(57) ABSTRACT

An apparatus for spray painting, such as a spray booth, includes a system for conveying pieces to be painted; a supply circuit to a spraying tool; a spray nozzle carried by a support arm movable along a predetermined direction; and a product change station having a discharge system and arranged in a predetermined position with reference to the working path of the support arm. The spraying tool is combined with a first coupling terminal which moves with the support arm and is sealingly coupled with a discharge duct, which has a second coupling terminal with the first coupling terminal, the two terminals being automatically movable by motorized movement members when aligned along a portion of their paths for mutual approaching and separation.

11 Claims, 6 Drawing Sheets

SPRAYING BOOTH HAVING A FAST DISCHARGE AND PRODUCT CHANGE STATION AND RELATED METHOD OF USE

FIELD OF THE INVENTION

The present invention relates to the technical field of equipment for the application of paints on predominantly flat-extension items (panels) and/or three-dimensional items, commonly known as painting booths. More specifically, the invention refers to a station for changing products on spraying tools; this station is located adjacent to the painting booth.

For a panel with a predominantly flat extension, a panel is intended where two of the three dimensions are much larger (by an order of magnitude) than the third dimension. Typically, the dimensions of such panels range from 100×300×18 mm to 1250×2400×30 mm.

For three-dimensional items, it means items where the three dimensions of the item are comparable to each other. Indicatively, such items have dimensions from 200×400×100 mm to 1300×3000×200 mm.

BACKGROUND OF THE INVENTION

Painting booths for spray paint application are known in the art, typically featuring a closed space (the booth) within which the items to be painted are conveyed by a conveying system. This conveying system is typically made up of at least two rollers, the first of which is motorized and the second is idle, and a closed belt on which the items to be painted are placed. The conveying system can ensure that the items are painted as they pass, i.e. continuously (that is, without stopping the closed belt), or intermittently: the items are transported into the booth, the belt stopped for the time needed to carry out the painting, and subsequently, the items are transported out of the booth.

It is known to provide such painting booths with systems for reading the items to be painted, with a plenum, and with air filtration systems. In this context, plenum means a ceiling or upper wall capable of distributing a flow of air entering the closed space of the booth where the painting operation occurs. Air is forcibly inserted inside the booth using fans, which can be adjusted to vary the speed and amount of air introduced per unit of time within the painting booth. The distribution of air must be as uniform as possible, and the air flow speed controlled. At different points of the plenum, the air flow delivered may vary, while it must be constant over time at the specific point. The adjustment of the supply fans aims to compensate for load losses so that the distribution of air to the plenum remains within the pre-set optimal limits. This plenum is in fluid connection with a suction tower placed on one side of the painting booth.

Spray application implies that not all the sprayed paint hits the item; the paint not applied on the item partly ends up on the item conveying system, and partly remains suspended in the air within the booth itself. This latter portion of sprayed paint is called overspray and is partially intercepted by the suction system equipped in the booth, which may be, in a known manner, of different types, and may or may not include a suction tower.

Lastly, it is known to place such a painting booth within a production line where a plurality of machines performing various types of processing are located in series upstream and downstream of such a painting booth. For example, upstream of the painting booth could be placed a machine that performs pre-treatment of the items to be painted, while downstream of the painting booth could be located a drying oven and/or a vertical warehouse.

Spraying booths that are equipped with systems for orienting and moving one or more spraying tools are known.

Specifically, spraying booths are known in which the spraying tools are carried by movement systems that have a limited number of degrees of freedom, specifically where the movement system comprises at least one arm or a shelf that moves forward and backward along a main direction of movement which direction has a predetermined orientation relative to the direction of advancement of the item to be painted, so-called oscillating sprayers, preferably a direction parallel to the direction of advancement of the item to be painted.

Said at least one degree of freedom in both directions and in said predetermined main direction may be combined with one or more additional degrees of freedom, particularly along further different and transverse directions relative to the main direction, as for example provided in a so-called Cartesian movement system, in which the arm or shelf that carries the spraying tools moves according to two or three axes orthogonal to each other and having predetermined orientations relative to the direction of advancement of the item in the painting booth.

Generally, as known in the art, the arm or shelf carries at least one, typically a plurality of spraying tools that are equipped with spray nozzles orientable relative to the axis of propagation of the spray opening and optionally also adjustable relative to said spray cone and/or to the size of the product droplets to be sprayed on the items. Each spraying tool is connected to a paint supply duct, said duct being connectable in turn to one or more supply circuits of one or more paints and/or also of solvent.

The spraying tools, also called guns, are provided in a certain number on a mobile support arm and can be grouped into two or more groups comprising a part of the total number of spraying tools provided on a mobile arm, each of which groups is connected to a supply circuit of a different painting product and/or solvent, which products differ for example in terms of the final effect both in color and surface appearance, and/or as regards the chemical/physical compatibility between said products. In this case, each circuit is provided with feeding organs of said products that take the product from a tank and supply it to the corresponding group of spraying tools.

Furthermore, it is also known to provide spraying booths with two spraying arms, each of which carries at least one painting tool, for example in the form of well-known spray guns.

Spraying booths are also known in which spraying tools are supported on one or two anthropomorphic robotic arms. In this case, however, the advantages of movement in space of the spraying tools are nevertheless conflicting with the cost of this type of movement systems that, although allowing, in practice, to freely move and orient the spraying tools as desired, present high acquisition and programming costs.

The current production system is based on batches and production queues and generates long lead times; moreover, it requires producing in advance relative to shipments.

Even with the most accurate production forecast, it is inevitably necessary to resort to emergency production of panels that were not present in the final warehouse, or alternatively to generate obsolescence if such warehouses are sized to have larger stock margins.

All of this is in contrast to the most modern production organization techniques based on methodologies known as Toyota Production System (TPS) or Lean Production or Just in Time (JIT). As market demands are pushed on the speed of delivery and on the customization of the product tailored to the customer, the need to reduce lead time, reduce the size of production batches, develop and produce special pieces, the production to warehouse as understood until today is destined to be limited only to product types (mass production) that are not customizable. The imperative that is posed is to produce in batch 1 with a huge variety of finishes and physical sizes of the pieces and with PULL production logics.

If the problem has been addressed in the mechanical processing phases and various solutions are found on the market, in the case of painting the problem is much more complex.

The set-up time of the finishing application machines, although it has been reduced to a few minutes, inevitably has a high cost for the waste of materials and washing solvents (in addition to the purchase cost, the disposal costs must also be taken into account). Therefore, to reduce these wastes, production is scheduled based on daily shipments, grouping the pieces to be produced as much as possible by the type of painting product used. Despite these methods, the number of painting product changes during a work shift goes from a hundred to several dozen.

Painting plants, to guarantee high drying times (approximately 6 hours) required by the most appreciated finishes on the market, operate with discontinuous systems (batches of 8-12 pieces on average).

In order to shorten the costs of machine downtime, especially in case of color changes, it is envisaged to associate with the spray booth a color or product change station that allows discharging the remains of paint previously used from the spraying tools, to wash said spraying tools and optionally also the paint supply ducts and to discharge the washing solvent from the spraying tools, conveying said liquids generated during the color change process to a collection tank.

The incidence of machine downtime times due to, for example, a painting product change, although significant for the performances of all types of painting systems, is particularly important in painting systems that operate in the aforementioned continuous mode. Therefore, a system that allows shortening these times would be particularly advantageous and attractive in this type of systems.

As is evident from the above, the process is complex and also requires a complex construction of the movement system of the spraying tools that must be brought each in correspondence with the discharge duct and/or the brush and/or the compressed air delivery mouth, as well as the solvent supply ducts and loading of the painting product in replacement of the one previously used. In particular, in the case of painting booths that are provided in combination with so-called oscillating spraying systems, as generically defined above, the few degrees of freedom of movement of the spraying tools granted by the movement systems make the product change operations difficult with a system according to the known art of the type described here.

Given the above, there is a need to improve the product change stations for the spraying tools especially in the so-called oscillating spraying systems as defined above, both from the point of view of simplifying the coupling paths of the units provided in the product change stations with the spraying tools and from the point of view of reducing the positioning times of the spraying tools in said product change stations and from the point of view of reducing the duration of the product change processes, thus minimizing machine downtime between one color change and another.

Typically, said product change processes may include at least a phase of discharging the product used in the previous cycle. This phase may involve both a simple emptying of the circuits and guns from the residual amount of said product and also in combination a washing using solvent that involves activating the supply system to said at least one spraying tool or to a corresponding group of said spraying tools for the supply to the same of a flow of washing solvent and the discharge of said solvent from the supply circuit and from said at least one spraying tool or from said group of spraying tools.

At the end of the emptying and/or washing cycle of said at least one spraying tool or of at least one group of spraying tools, a feeding phase to the same, i.e., loading of a new painting product to be applied by spray on the items, is provided as known.

SUMMARY OF THE INVENTION

According to a first embodiment, the invention achieves the aforementioned objectives with an apparatus for spray painting, or with a painting booth equipped in combination with at least one product change station to the spraying tools, in which said spray booth comprises:

- a conveying system for one or more items to be painted inside said booth and for evacuating said items from said booth at the end of painting;
- a supply circuit of a painting product and/or a solvent to one or more spraying tools;
- at least one spraying tool comprising at least one spray nozzle which spraying tool is carried by at least one support arm and which support arm is movable forwards and backwards along a working path along a predetermined direction having a predetermined orientation relative to the transit path of the items to be painted through said booth, preferably along a predetermined direction transverse to said transit direction;
- at least one product change station;
- said station being provided with a discharge system, i.e., a discharge or evacuation system, connectable to said at least one spraying tool and/or to the supply circuit of the same in combination with a supply system to said spraying tools of one or more painting products and/or solvents;
- said product change station being provided in a predetermined position in the painting booth with reference to the working path of the support arm of said at least one spraying tool;
- said at least one spraying tool being provided in combination with at least one sealing coupling terminal to at least one discharge duct of said discharge system;
- which sealing coupling terminal on said movable arm moves along a predetermined trajectory together with the movement of the movable arm along said working path;
- said discharge duct is provided with a sealing coupling terminal with said corresponding sealing coupling terminal of said at least one spraying tool and
- said product change station, or said discharge duct and/or said sealing coupling terminal to the corresponding terminal of said at least one spraying tool, are provided in coincidence with a dedicated section and/or point of the path of the terminal of said at least one spraying tool, in correspondence with which the two terminals respectively of said at least one spraying tool and said discharge duct are in an aligned position with reference to a reciprocal coupling stroke;

said terminal of said at least one spraying tool and/or said terminal of the discharge duct or said discharge duct itself being movable relatively to each other along said coupling stroke in the direction of reciprocal coupling automatically when said terminals are aligned with each other with reference to said stroke, motorized movement members being provided which can be activated alternately for the approach in sealed coupling condition of said terminals and for the mutual separation in decoupling condition.

According to a preferred embodiment, the coupling and decoupling stroke of the two terminals of said at least one spraying tool and of said discharge duct is provided rectilinear and in a direction substantially transverse to the direction defined by the working path of the movable arm and therefore of the sealing coupling terminal of said at least one spraying tool.

Furthermore, said coupling and decoupling stroke may also be oriented in a direction transverse to the transit direction of the items to be painted in the painting booth.

In a preferred and non-limiting embodiment, the discharge duct is made of a straight tubular duct preferably cylindrical and is slidably mounted in the direction of its longitudinal axis in a guide, being movable alternately forwards and backwards along a rectilinear run parallel with said longitudinal axis between a position of coupling to the terminal of said at least one spraying tool and a position of decoupling of the same thanks to a motorized linear translation actuator.

Said actuator is preferably a hydraulic or pneumatic cylinder, but it may also be an electromechanical and/or magnetic-mechanical linear actuator.

Further according to an embodiment, the coupling terminal is constituted by a sealing flange provided at the end of said discharge duct facing the sealing coupling terminal of said at least one spraying tool, while the latter terminal is also constituted by a protuberance or a nozzle shaped in such a way as to engage in a sealed manner in said terminal flange of the terminal of the discharge duct, the seal being generated by axial and/or possibly also radial compression between said two terminals.

In an advantageous configuration of the apparatus according to the present invention, the path of the movable arm and therefore of the coupling terminal of said at least one spraying tool is along a direction perpendicular to the coupling/decoupling stroke of the terminal of the discharge duct with the terminal of said at least one spraying tool, i.e., to the longitudinal axis of said discharge duct.

A preferred embodiment provides that the working path of the movable arm is substantially straight and in the horizontal plane, while the direction of the coupling stroke of the terminal of the discharge duct is straight and vertical.

Furthermore, in an embodiment, the product change station is positioned in correspondence with an extension of the working path of the movable arm and/or a stretch of extra run of said working path.

In a preferred embodiment, the movable arm and therefore said at least one spraying tool are also movable along further directions, such as vertically and/or in a further direction in the horizontal plane.

The determination of the correct alignment position of the terminal of said at least one spraying tool and of said discharge duct can take place automatically by means of mechanical and/or electromechanical and/or electronic position sensors and of the contact or non-contact type, such as proximity sensors and/or optical sensors or others, the technician in the field being able to select from the sensors known in the art the one most suitable for the application.

Regarding the apparatus, in combination with said product change station, said at least one spraying tool is provided in combination with at least one product supply circuit which is connected or connectable to a corresponding tank of said product and which can advantageously be provided with a system of servo-controlled valves and/or organs that generate a predetermined flow rate and pressure from said tank to said at least one spraying tool.

According to further embodiments, a certain number of spraying tools can be mounted on each movable arm. These can also be grouped into two or more groups comprising a part of the total number of spraying tools provided on a movable arm, each of which groups is connected to a dedicated supply circuit of a painting product and/or solvent. In this case, each circuit is provided with feeding organs of said products that take the product from a corresponding tank and supply it to the corresponding group of spraying tools.

In combination with the embodiment that provides for at least two spraying tools or at least two groups of spraying tools on the same movable arm, it is possible to provide that the same are connected separately for each of said at least two spraying tools or for each of said at least two groups of spraying tools to a dedicated coupling terminal to a single discharge duct provided for each of the various coupling terminals on the movable arm and in correspondence with which the individual coupling terminals are brought, in the condition of relative alignment with the stroke of coupling/decoupling with the terminal of said single discharge duct, in succession. Alternatively, the product change station may be provided with two or more discharge ducts or with a number of discharge ducts corresponding to the number of coupling terminals on the movable arm, each of the discharge ducts having a predetermined alignment position with respect to one of the coupling terminals on the movable arm, such that at least part or all of said coupling terminals on the movable arm simultaneously assume the correct alignment position relative to the stroke of coupling/decoupling with the corresponding discharge duct, or with the terminal thereof.

From the above, it is evident the extreme constructive simplicity, the structural and functional robustness, and the case of positioning the spraying tool or tools in the product change station, as well as the duration of the coupling steps to the discharge duct that are possible with the present invention.

The product change method provides the steps of:

defining the position of a product change station in such a position as to fall in correspondence with a stretch of extra run or an extension of the working path of a movable arm carrying at least one spraying tool, the orientation of which stretch coincides with that of the working path, i.e., does not involve deviations thereof;

positioning at a predetermined point of said extra run a discharge duct with an automatic coupling terminal to a corresponding terminal associated with said at least one spraying tool and carried by said movable arm;

positioning the coupling terminal of said at least one spraying tool on said movable arm and in such a position that upon reaching the predetermined position of the coupling terminal of the discharge duct in said stretch of extra run said two terminals are aligned with each other in a condition of readiness for coupling thanks to a relative coupling stroke along a direction substantially transverse to the direction of said extra run and/or of the working path of the movable arm carrying said at least one spraying tool;

detecting the alignment position of said condition of readiness for coupling of said two coupling terminals;

commanding the execution of the coupling stroke in sealed condition of said two terminals;

performing the discharge operations and/or optionally the loading of the new product;

commanding the decoupling of said two terminals and the abandonment by the movable arm of the stretch of extra run of parking thereof in the product change station for the execution of the working run.

Also in relation to the aforementioned method, it is possible to provide for at least two spraying tools or at least two groups of spraying tools on a movable arm in combination with two or more dedicated coupling terminals respectively for one of said at least two spraying tools or of said at least two groups of spraying tools and in combination with one or more spray ducts as described above.

In a preferred embodiment, the apparatus, i.e., the painting booth, may be provided with two or more than two independent movable arms among themselves and each of which carries at least one spraying tool intended to deliver paint in a predetermined area, at least one or optionally two or more product change stations being provided, each of which is dedicated respectively to the spraying tools of one only or more of the movable arms provided in the painting booth.

Furthermore, advantageously, the station is provided alongside the working path of the movable arm so that it is not necessary to perform extra runs or to provide positions of the product change station positioned far from the working path of the spraying tool or tools, but the terminal associated with the movable arm normally follows a trajectory that passes through the alignment position with the terminal of the discharge duct and the movable arm is stopped in said alignment position and the discharge duct is moved along the coupling stroke when the execution of a product change cycle of the spraying tool or tools provided on the movable arm is envisaged.

The above further simplifies the construction and the product change process and further reduces the duration of this process.

BRIEF DESCRIPTION OF THE DRAWINGS

The present invention will be described below in one of its embodiments with the aid of the following figures, which show.

DETAILED DESCRIPTION OF EMBODIMENTS OF THE INVENTION

Figure 1:
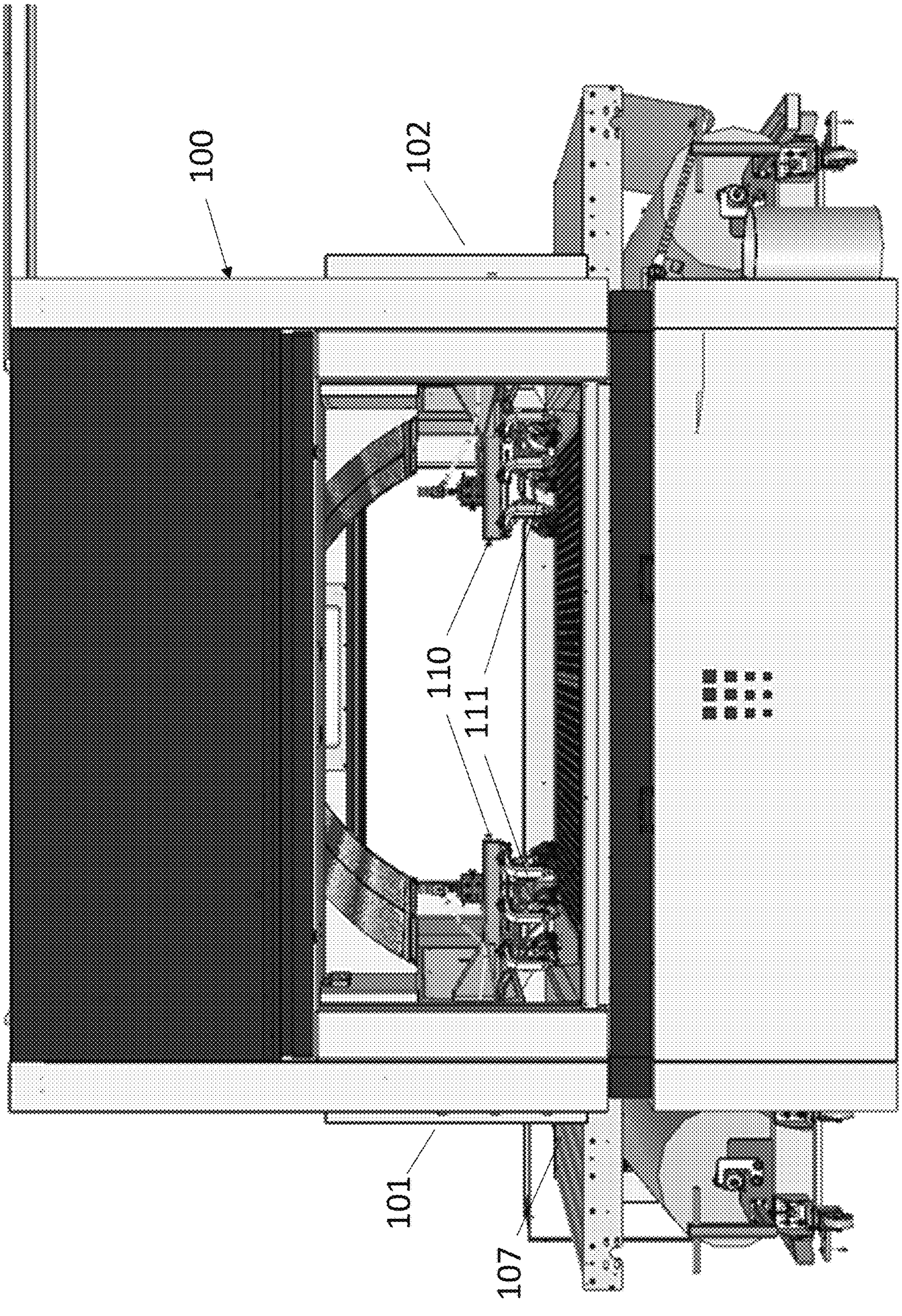
FIG. 1 is a side elevational view of a painting booth according to an embodiment of the present invention seen in a direction perpendicular to the direction of advancement of the piece to be painted.
Figure 2:
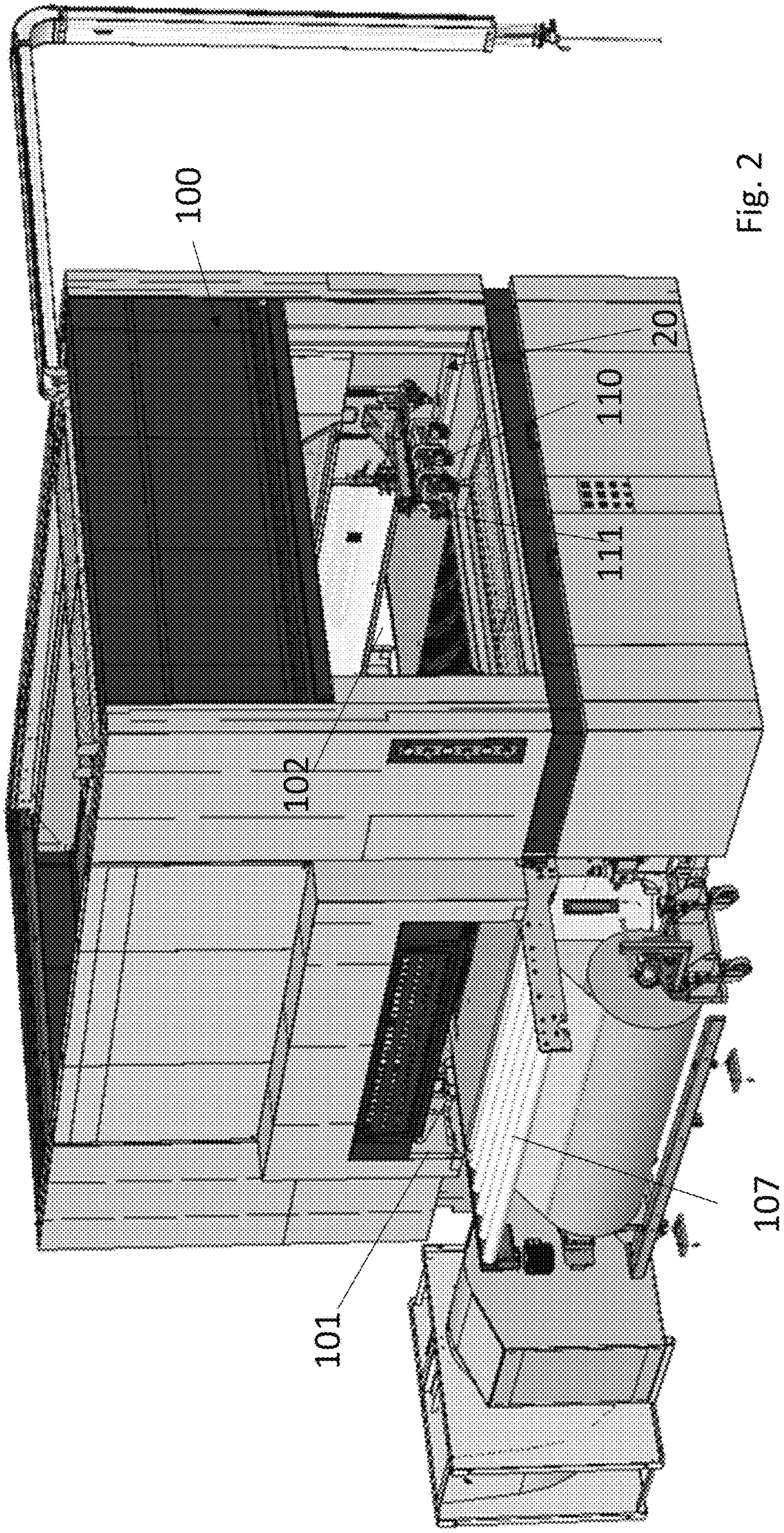
FIG. 2 is an isometric view of the painting booth according to FIG. 1.

FIGS. 1 and 2 show a typical spray painting booth 100, where pieces to be painted, either predominantly flat-extended or three-dimensional, are conveyed by a conveyor 107 inside the booth into a painting position and then discharged from it. The pieces enter the booth through an entrance and exit through an exit, which are indicated by 101 and 102 in FIGS. 1 and 2.

The painting booth according to the present invention is equipped with a mobile arm 110 that carries a plurality of spraying tools denoted by 111, which are oriented with their spray nozzles to cover a predetermined area with the spray of paint.

The spraying tools, also known as guns, are connected through conduits 112 to one of two first terminals 113, 114. Terminal 114 forms a sealing coupling terminal with a corresponding second terminal 121 provided at the end of a discharge duct 120 facing towards terminal 114 carried by the mobile arm 110.

As shown in FIGS. 1 and 2, the mobile arm can move along a straight work path that is substantially perpendicular to the direction of advancement of the piece from the entrance 101 to the exit 102 of the booth, thereby passing over a transverse band of the piece relative to said advancement direction.

In the illustrated embodiment, the translation of the mobile arm 110, and thus of the guns 103, occurs in the horizontal plane, but this is not to be considered limiting of the present invention, although it is a preferred solution.

The aforementioned discharge duct 120 is mounted in a product change station globally indicated by 20. As shown in the figures, the product change station 20 is laterally adjacent to the conveyor 107 of the piece to be painted, and this position is reachable by the mobile arm 110 thanks to an end run terminal positioning of the same with the corresponding spraying tools 111 and with terminal 113 and/or 114.

When the mobile arm reaches the product change station 20, it is stopped in a position where the coupling terminal, to which the spraying tools 113 and/or 114 are connected—in this case terminal 114—is positioned vertically aligned with the coupling terminal 121 provided at the facing upper end of the discharge duct 120.

Figure 3:
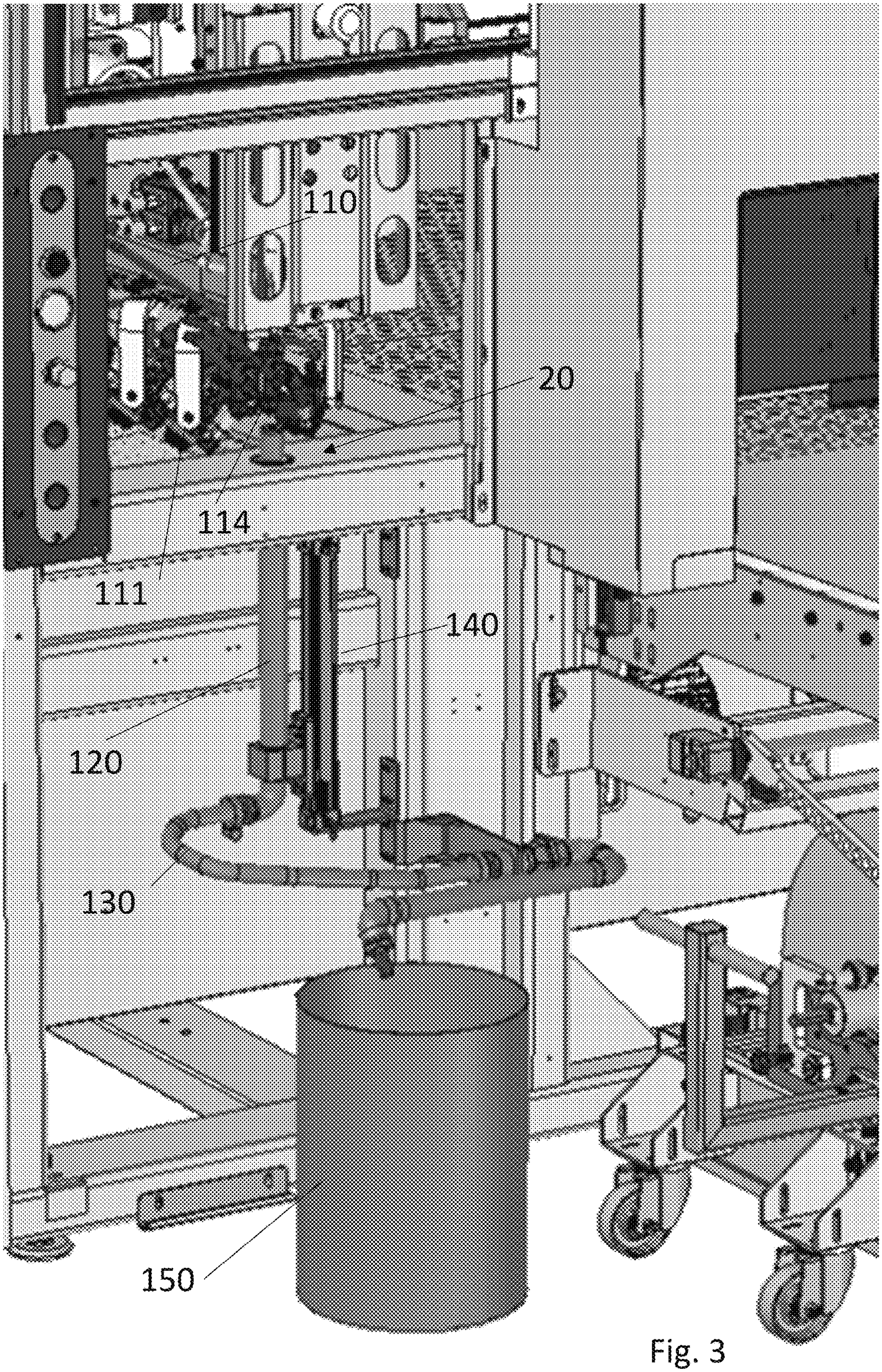
FIG. 3 is an enlarged view of the discharge station area for product change.

In the illustrated embodiment, terminal 121 is provided on a straight terminal section of the discharge duct that has a predetermined length and is oriented with its axis in the vertical direction, while said discharge duct is connected to the rest of the discharge circuit 130 by means of at least one section of flexible tubing, and while said terminal section 120 of the discharge duct is mounted slidably axially in a guide support 122. Said terminal section 120 of the discharge duct is fixed to a linear actuator 140 that is oriented to perform a run in the vertical direction, i.e., parallel to the axis of the terminal section 102 of the discharge duct. (FIG. 3). The discharge duct may terminate in a collection system, for example in a collection container 150 shown also in FIG. 3.

Figure 4:
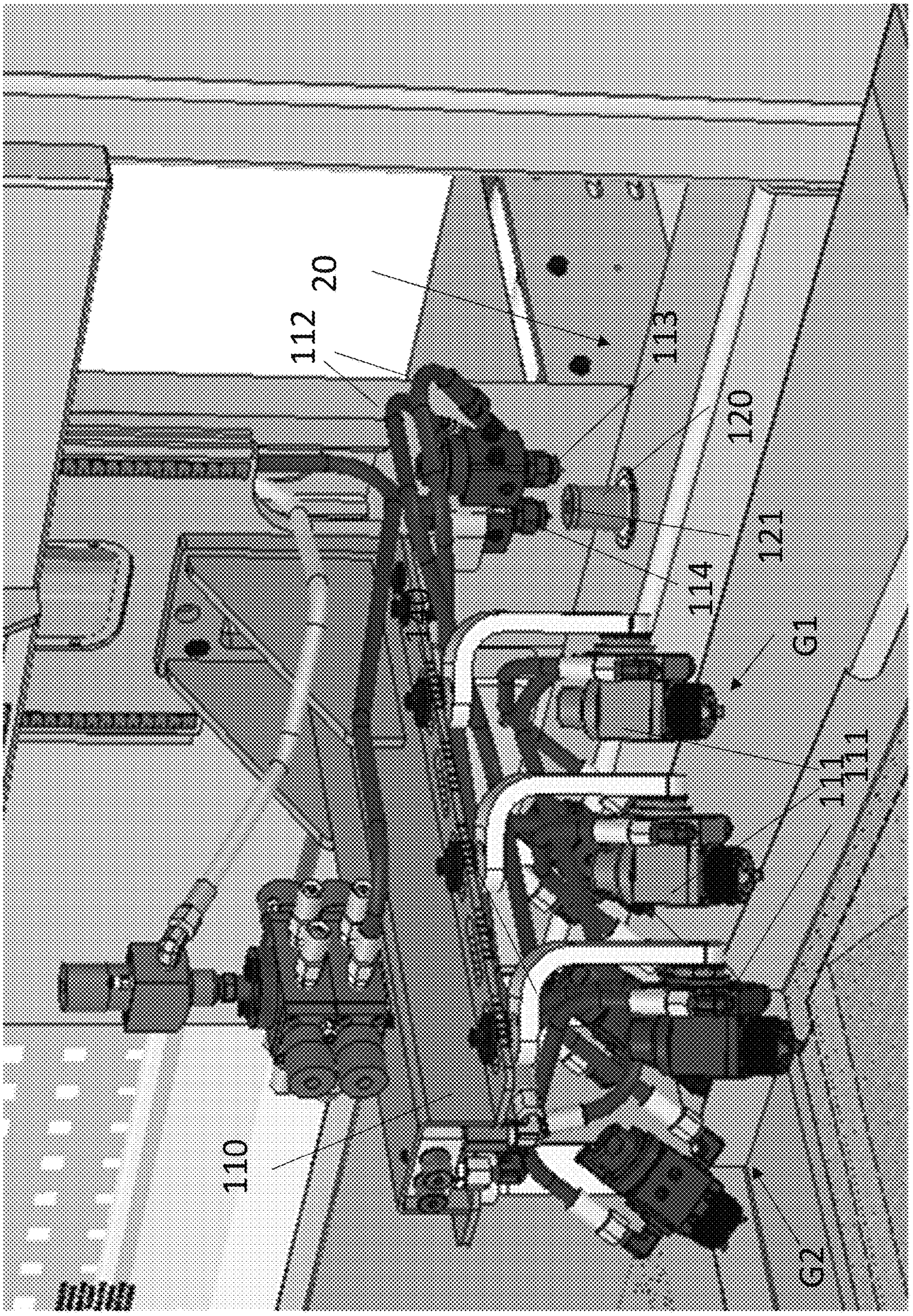
FIG. 4 is an enlarged view of the detail of a movable arm carrying a plurality of spraying tools, i.e., spray guns, and the product change station with the coupling terminal of the spraying tools to the terminal of the discharge duct not yet aligned with each other with reference to the automatic coupling stroke in scaled condition of the same.
Figure 5:
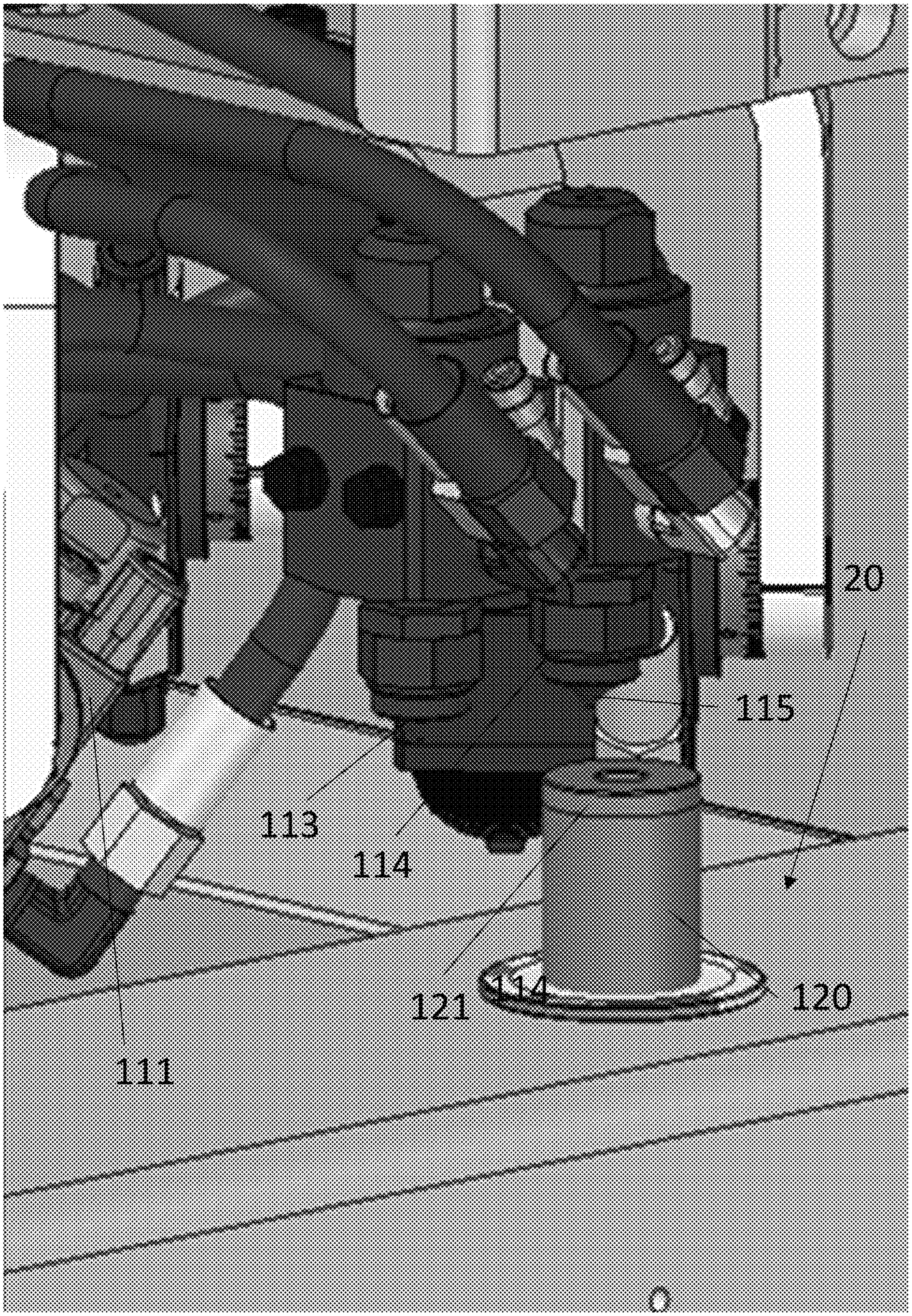
FIG. 5 is a view of the enlarged detail of the coupling terminal associated with the movable arm carrying said or said spraying tools in a condition close to that of alignment along the coupling stroke with the terminal of the discharge duct.
Figure 6:
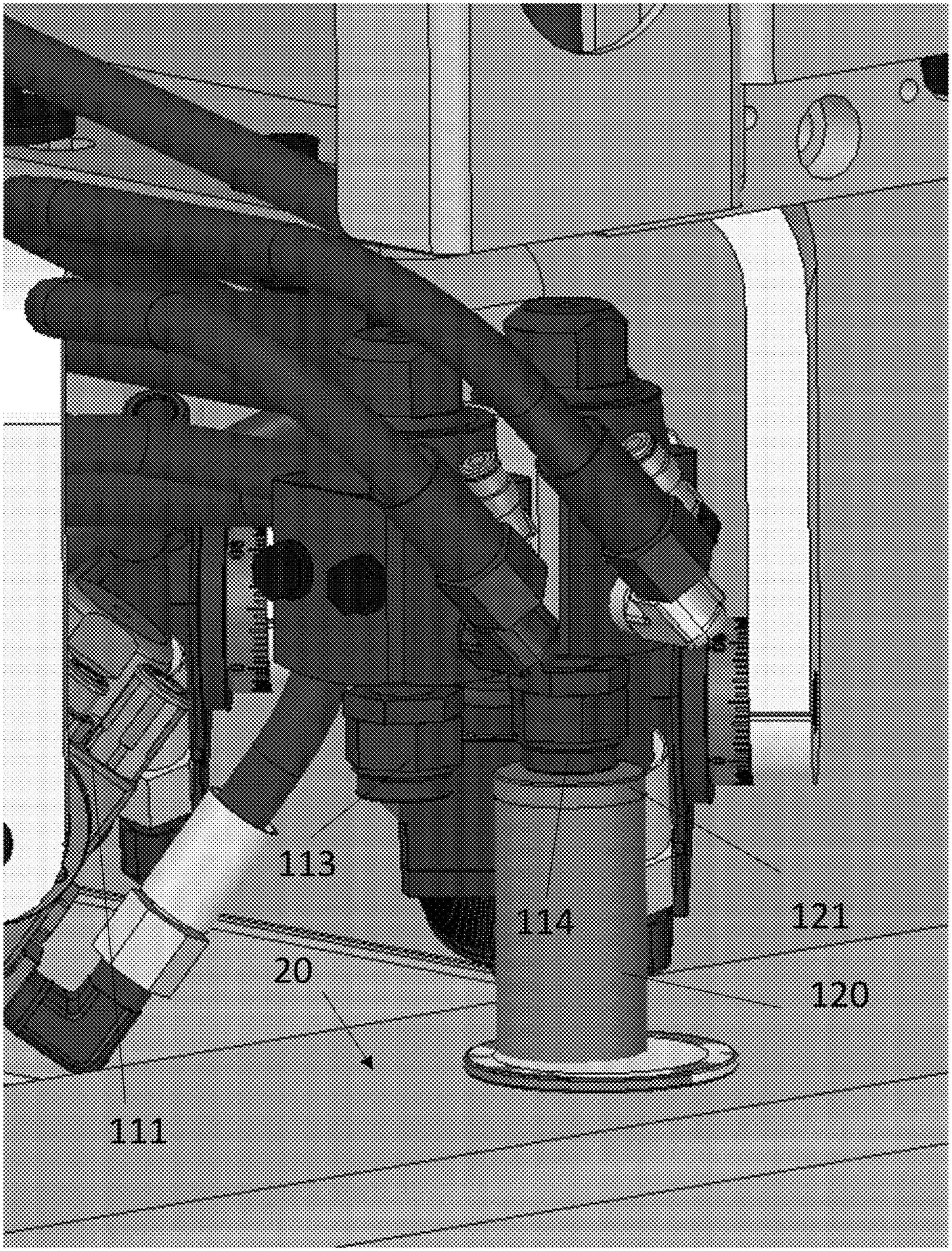
FIG. 6 is a view analogous to that of FIG. 5, with the coupling terminal associated with the movable arm carrying said spraying tool or said spraying tools in the condition of sealed coupling with the terminal of the discharge duct.

Referring to FIGS. 4 and 5, these show the mobile arm in the extra positioning run stretch of the product change station and with one of the terminals 113 and 114 in a position close to alignment with the vertical run direction of the straight terminal section 120 of the discharge duct. In this case, the positioning of the mobile arm along the stretch of extra run is commanded in such a way as to bring terminal 114 into a vertically aligned position with terminal 121 at the end of the vertical section of the discharge duct 120 so that the coupling of the two terminals 121 and 114 can occur thanks to a straight and vertical coupling run performed by said terminal section 120 of the discharge duct following the actuation by the actuator cylinder 140.

The terminals 113, 114, and 121 can be configured in any manner and such that they ensure an automatic sealed coupling thanks to the sole vertical run of the terminal section of the discharge duct.

One possible solution among the many available to the expert in the field provides that terminal 113 and/or 114 on the mobile arm has a coaxial nozzle extension 115, preferably of elastically compressible material, which nozzle is intended to insert with a vertical run into the coincident hole of an annular flange which constitutes terminal 121 at the end of the vertical section of the discharge duct. Even in this case, said flange is made of elastically deformable material. The diameter of the hole has a size corresponding to a diameter of the extension 115, which is advantageously made conical or funnel-shaped. Said parts are sized so that at the time of their compression in coupling condition, axial and radial sealing surfaces are generated that produce the necessary seal for the execution of the product change operations.

The two terminals 113 and 114 can be associated with two different supply circuits 112 which each connect to a part of the spraying tools present on the mobile arm 110. Alternatively, the two circuits can be intended for performing different product change operations.

It is worth noting that the illustrated configuration provides for a single discharge duct in correspondence with which one of the two coupling terminals 113, 114, which connect to the two groups of spraying tools denoted G1 and G2, is brought according to a predetermined sequence.

Alternatively, it is possible that the product change station is equipped with two discharge ducts that are positioned side by side along the direction of said extra run of the mobile arm 110 and with a relative distance between them such that when one of the two terminals 114 or 113 is aligned relative to the coupling/decoupling run with a terminal of one of said discharge ducts, the other terminal 113 or 114 provided on the mobile arm is automatically correctly aligned with the other discharge duct. In this case, therefore, the product change operations can also be performed simultaneously for the two groups of spraying tools G1, G2.

As is evident from the above, the change operations are extremely simple and reliable, requiring only the positioning of the mobile arm and the detection of the correct alignment position of the terminal or terminals 113 and/or 114 with terminal 121 of the discharge duct 120 relative to the vertical run of coupling and decoupling of the same.

A control unit can execute a product change program that provides for commanding the mobile arm or arms, when there are more than one, in the corresponding product change station performing the expected extra run beyond the lateral limit of the piece conveying path. During the execution of this extra run, one or more sensors detect the position of the terminal or terminals 113 and/or 114 relative to terminal 121 of the discharge duct or a corresponding discharge duct when a discharge duct is provided for each terminal on the mobile arm, and stop the translation of the arm when said terminals are aligned in coincidence with the vertical run of reciprocal coupling with the corresponding discharge duct. In this condition, the linear actuator is activated, which translates the straight terminal section of the discharge duct or ducts vertically upwards, bringing the terminals into sealed engagement with each other.

At the end of the product change operations, the discharge duct or ducts are moved vertically downwards, and the mobile arm 110 can resume normal operation.

100 Paint booth
101 Entrance of the booth
102 Spray exit
107 Conveyor
110 Mobile arm
111 Spraying tool
112 Feeding conduits for spraying tools
113, 114 Coupling terminals
115 Nozzle extension
120 Discharge duct
20 Product change station
121 Coupling terminal on the discharge duct
130 Discharge circuit
140 Linear actuator
150 Collection container
G1, G2 Groups of spraying tools served by a dedicated feeding circuit for each group

The invention claimed is:

1. An apparatus for spray painting, comprising a spray booth provided in combination with a product change station to spraying tools, the spray booth comprising:

a system for conveying one or more pieces to be painted inside the spray booth and for evacuating the one or more pieces from the booth after painting;

a supply circuit of a painting product and/or a solvent to one or more spraying tools, at least one spraying tool comprising a spray nozzle and being carried by a support arm which is translatable forward and backward on a working path along a predetermined direction and has a predetermined orientation relative to a transit path of the one or more pieces to be painted through the booth; and a product change station provided with a discharge system, which includes a discharge or evacuation system and is connectable to the at least one spraying tool and/or to the supply circuit of the at least one spraying tool of the painting product and/or the solvent, the product change station being provided in a predetermined position in the spray booth with reference to the working path of the support arm of the at least one spraying tool, wherein:

the at least one spraying tool is provided in combination with a first terminal for sealing coupling to at least one discharging duct of the discharging system, the first terminal is on the support arm and moves along a predetermined trajectory together with a movement of the support arm along the working path, the discharge duct is provided with a second terminal for sealing coupling with a corresponding first terminal, the product change station, the discharge duct, and/or the first terminal (121) are provided in coincidence with a dedicated section and/or point of the path of the first terminal, in correspondence with which the first and the second terminal are in an aligned position with reference to a reciprocal coupling stroke, and the first terminal and/or the second terminal or the discharge duct are movable in relation to each other along the coupling stroke in a direction of reciprocal coupling, automatically when the first and the second terminal are aligned with each other with reference to the coupling stroke;

further comprising motorized movement members, which can be activated alternately for an approach in a sealed coupling condition of the first and the second terminal and for a mutual separation in a decoupling condition.

2. The apparatus according to claim 1, wherein the coupling stroke and a decoupling stroke of the first terminal and the second terminal is rectilinear and in a transverse direction to a direction defined by the working path of the support arm, and optionally with respect to a transit direction of the one or more pieces to be painted in the spray booth.

3. The apparatus according to claim 1, wherein the discharge duct is configured as a straight tubular duct and is slidably mounted in a direction of its longitudinal axis in a guide, and can be moved alternately forward and backward along a rectilinear run parallel to the longitudinal axis between a position of coupling to the first terminal and a position of decoupling of the discharge duct due to a linear translation actuator.

4. The apparatus according to claim 1, wherein the second terminal comprises a sealing flange provided at an end of the discharge duct and facing the first terminal, and wherein the first terminal is constituted by a protuberance or spout shaped to hermetically engage in the sealing flange of the second terminal, a seal being generated by axial and/or possibly also radial compression between the first terminal and the second terminal.

5. The apparatus according to claim 1, wherein the path of the support arm and therefore of the first terminal is along a direction perpendicular to the coupling stroke and a decoupling stroke of the second terminal with the first terminal.

6. The apparatus according to claim 1, wherein the working path of the support arm is straight and in a horizontal plane, and wherein the direction of the coupling stroke of the second terminal is straight and vertical.

7. The apparatus according to claim 1, wherein the product change station is positioned in correspondence with an extension of the working path of the support arm and/or with an extra stroke section of the working path.

8. The apparatus according to claim 1, wherein the support arm and the at least one spraying tool are movable along further additional directions.

9. The apparatus according to claim 1, wherein there are two or more support arms that are independent from one another, wherein of the two or more support arms carries a spraying tool for dispensing the paint in one predetermined area, and wherein at least one or more product change stations are provided, which are each devoted to respectively to one or more spraying tools of only one or of a plurality of support arms.

10. The apparatus according to claim 1, wherein:

the support arm carries a plurality of groups of spraying tools each comprising at least one spraying tool, each of which groups being connected to a dedicated feed duct of a product, each group of spraying tools being associated with a corresponding dedicated first terminal, the product change station has a single discharge duct couplable in sequence to each of the first and the second terminals, or the product change station has at least two discharge ducts, each devoted to at least one of the plurality of groups of spraying tools or to some of the plurality of spray groups on the support arm, spray pipes and corresponding first terminals being arranged in positions such as to allow a simultaneous automatic coupling of the corresponding first terminals with a corresponding dedicated discharge duct.

11. A method of product change to spraying tools in a spray booth comprising:

defining a position of a product change station to a position such as to fall in correspondence with a stretch of extra run or of extension of a work path of a movable arm that carries at least one spraying tool, an orientation of the stretch coinciding with an orientation of the work path, without deviations from the work path;

positioning, at a predetermined position of the extra run, a discharge duct with a second terminal with automatic coupling terminal to a corresponding first terminal associated with the at least one spraying tool and carried by the movable arm;

positioning the first terminal on the movable arm and in such a position that when the predetermined position of the second terminal is reached in the extra run, the first and the second terminals are aligned with each other in a condition of ready coupling due to a relative coupling stroke along a direction transversal to the direction of the extra run and/or of the work path of the movable arm that carries the at least one spraying tool;

detecting an alignment position of a coupling readiness condition of the first and the second terminals;

commanding an actuation of a sealing coupling stroke of the first and the second terminals;

carrying out discharge operations and/or optionally loading a new product; and commanding a decoupling of the first and the second terminals and an abandonment by the movable arm of an extra parking run of the movable arm in the product change station for an execution of a work stroke.

* * * * *